(12) United States Patent
Garvey et al.

(10) Patent No.: US 11,280,764 B2
(45) Date of Patent: Mar. 22, 2022

(54) ULTRASONIC INSPECTIVE DEVICE FOR SIMULTANEOUS PULSE ECHO AND THROUGH TRANSMISSION INSPECTION

(71) Applicant: The Boeing Company, Chicago, IL (US)

(72) Inventors: Jeffry J. Garvey, San Clemente, CA (US); James C. Kennedy, Port Angeles, WA (US); Roy Martin Gagnon, San Antonio, TX (US)

(73) Assignee: THE BOEING COMPANY, Chicago, IL (US)

( * ) Notice: Subject to any disclaimer, the term of this patent is extended or adjusted under 35 U.S.C. 154(b) by 195 days.

(21) Appl. No.: 16/555,499

(22) Filed: Aug. 29, 2019

(65) Prior Publication Data

US 2021/0063357 A1 Mar. 4, 2021

(51) Int. Cl.
*G01N 29/34* (2006.01)
*G01N 29/24* (2006.01)
*G01N 29/07* (2006.01)

(52) U.S. Cl.
CPC ........... *G01N 29/345* (2013.01); *G01N 29/07* (2013.01); *G01N 29/24* (2013.01); *G01N 29/343* (2013.01); *G01N 2291/106* (2013.01)

(58) Field of Classification Search
CPC ...... G01N 29/345; G01N 29/24; G01N 29/07; G01N 29/343; G01N 29/223; G01N 2291/106; G01N 29/2638; G01N 29/044; G01N 29/048
See application file for complete search history.

(56) References Cited

U.S. PATENT DOCUMENTS

| | | | |
|---|---|---|---|
| 7,240,556 B2 | 7/2007 | Georgeson et al. | |
| 7,823,451 B2 | 11/2010 | Sarr | |
| 2006/0243051 A1* | 11/2006 | Bui | G01N 29/28 73/618 |
| 2017/0168022 A1* | 6/2017 | Georgeson | G01N 29/262 |
| 2017/0219533 A1* | 8/2017 | Alford | G01N 29/04 |
| 2019/0353623 A1* | 11/2019 | Fournel | G01N 29/4472 |

* cited by examiner

*Primary Examiner* — Suman K Nath
(74) *Attorney, Agent, or Firm* — Coats & Bennett, PLLC (57) ABSTRACT

An ultrasonic inspection device for inspection of a structure. The device includes a body with a first side and a second side that are on opposing sides of a gap. The gap is sized to receive the structure. A probe is attached to the first side and transmits ultrasonic signals at the structure. A reflector plate is attached to the second side and is fixed relative to the probe and reflects the signals that pass through the structure. The probe is configured to detect the signals that reflect off the structure and to detect the signals that pass through the structure and reflect off the reflector plate. The received signals provide for pulse echo and through transmission inspection of the structure.

20 Claims, 8 Drawing Sheets

ULTRASONIC INSPECTIVE DEVICE FOR SIMULTANEOUS PULSE ECHO AND THROUGH TRANSMISSION INSPECTION

TECHNOLOGICAL FIELD

The present disclosure relates generally to the field of ultrasonic inspection devices and methods and, more specifically, to ultrasonic inspection devices and methods that provide for simultaneous pulse echo and through transmission inspection of a structure.

BACKGROUND

Nondestructive inspection involves examining the structure without harming the structure. Nondestructive inspection can be used in a wide variety of contexts, including in the aircraft, automotive, metallurgy, and manufacturing industries. Various different types of inspection techniques can be used on the structure, such as but not limited to pulse echo inspection and through transmission inspection. The different inspection methods can provide for identifying different aspects of the structure. For example, a first type of inspection can determine a porosity of a structure. A different second type of inspection can determine the existence of interior interfaces within the structure, such as voids, delaminations, and foreign materials.

It can be desirable to perform both types of inspection on a structure. A current option is to perform two separate inspections of the structure. For example, a first inspection pulse echo inspection is performed on the structure followed by a second through transmission inspection. A disadvantage of this option is the extra time necessary to perform the two separate inspections. This may be feasible when inspecting a limited number of structures, but is not practical when performing inspections on a large number of structures and/or large structures that take a relatively long time to fully inspect with each type of inspection.

Another current option is to equip an inspection device to perform multiple different inspections. However, this can include adding additional hardware, such as one or more additional ultrasonic arrays and associated cables. This makes manipulation of the inspection device more difficult for manual inspections and increases the risk for improper inspections. For example, modifying a pulse echo inspection device to inspect for porosity can result in errors if the additional array is misplaced by a small amount.

SUMMARY

The subject matter of the present application provides examples of ultrasonic inspection devices and methods of ultrasonically testing a structure that overcome the above-discussed shortcomings of existing inspection devices and methods.

One aspect is directed to an ultrasonic inspection device for simultaneous pulse echo inspection and through transmission inspection of a structure. The device comprises a body with a first side and a second side that are spaced apart by a gap. The body is configured to receive the structure in the gap between the first side and the second side. A probe is positioned on the first side to transmit ultrasonic signals at the structure. A reflector plate is positioned on the second side and is fixed relative to the probe. The probe is configured to receive a first portion of the ultrasonic signals that are reflected off interfaces of the structure and a second portion of the ultrasonic signals that pass through the structure and are reflected off the reflector plate.

In another aspect, the probe comprises one or more phased array transducers that each comprise a plurality of transducer elements.

In another aspect, the transducer elements of each of the one or more phased array transducers are aligned in a first plane and the reflector plate comprises a reflective surface that is aligned in a second plane with the first and second planes being substantially parallel.

In another aspect, a control unit includes a control circuit and a memory circuit with the control unit configured to receive data indicative of the signals reflected off the interfaces and the signals reflected off the reflector plate, the control unit further configured to output a signal indicative of a porosity of the structure and to identify one or more of a void, delamination, and foreign material in the structure.

In another aspect, a jack screw extends between the first side and the second side of the body with the jack screw configured to adjust a distance between the probe that is on the first side and the reflector plate that is on the second side.

In another aspect, the body comprises a unitary construction with the first side and the second side being fixed relative to one another.

In another aspect, the reflector plate comprises a curved shape.

In another aspect, each of the probe and the reflector plate comprise a concave shape with a center of the gap being wider than opposing ends of the gap.

In another aspect, the probe comprises a plurality of transducer elements that transmit the ultrasonic signals at the structure and that receive at least one of the first portion and the second portion of the ultrasonic signals.

In another aspect, the probe comprises a plurality of transducer elements that are aligned along a curved face and the reflector plate comprises a curved reflective surface with the curved face and curved reflective surface having opposing shapes with a center of the gap being wider than ends of the gap.

One aspect is directed to an ultrasonic inspection device for simultaneous pulse echo inspection and through transmission inspection of a structure. The device comprises a body, a reflector plate attached to the body, and a probe attached to the body and positioned away from the reflector plate by a gap that is sized to receive the structure. The probe is configured to transmit ultrasonic signals at the structure positioned in the gap and receive reflections of the signals that are reflected from the structure and from the reflector plate. A control unit comprises a control circuit configured to determine a first characteristic of the structure based on the reflections of the signals that are reflected from the structure and to determine a second characteristic of the structure based on the reflections of the signals that are reflected from the reflector plate.

In another aspect, the probe comprises a plurality of transducer elements that are aligned in a first plane and that transmit the ultrasonic signals and receive the reflections, and the reflector plate comprises a reflective surface that is aligned in a second plane with the first plane being substantially parallel to the second plane.

In another aspect, the probe comprises a plurality of transducer elements that are aligned along a curved face and the reflector plate comprises a curved reflective surface with the curved face and curved reflective surface having opposing shapes with a center of the gap being wider than ends of the gap.

In another aspect, the body comprises a first section and a second section that are adjustable relative to each other to adjust a distance between the reflector plate and the probe.

In another aspect, the first characteristic comprises one or more of a void, delamination, and foreign material in the structure and the second characteristic comprises a porosity of the structure.

One aspect is directed to a method of ultrasonically testing a structure. The method comprises: receiving the structure in a gap formed in a body with the structure being positioned between a probe that is mounted to the body on a first side of the gap and a reflector plate that is mounted to the body on a second side of the gap; emitting ultrasonic signals from the probe towards the structure; receiving reflections of signals that reflect off one or more interfaces of the structure and reflections of signals that reflect off the reflector plate after passing through the structure; determining a first characteristic of the structure based on the reflections that are received after reflecting off the one or more interfaces of the structure; and determining a second characteristic of the structure based on the reflections that are received after reflecting off the reflector plate.

In another aspect, the method includes adjusting a width of the gap prior to receiving the structure in the gap.

In another aspect, the method includes maintaining the probe aligned substantially parallel to the reflector plate while moving the body along the structure as the structure passes through the gap and between the probe and the reflector plate.

In another aspect, the method includes emitting the ultrasonic signals from the probe in a time phased manner.

In another aspect, the method includes preventing the reflector plate from moving relative to the probe while the probe is emitting the ultrasonic signals and receiving the reflections of signals that reflect off one or more interfaces of the structure and reflections of signals that reflect off the reflector plate after passing through the structure.

The features, functions and advantages that have been discussed can be achieved independently in various aspects or may be combined in yet other aspects, further details of which can be seen with reference to the following description and the drawings.

DETAILED DESCRIPTION

Figure 1:
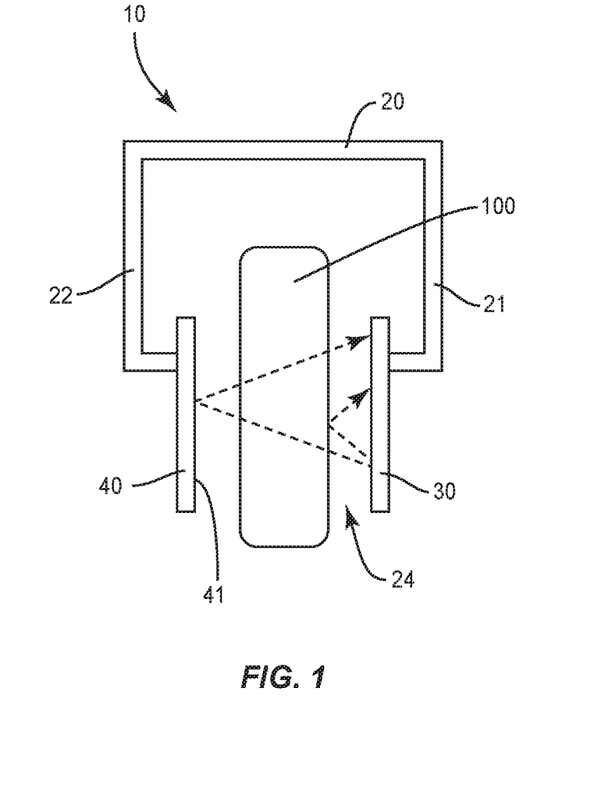
FIG. 1 is a schematic side view of an inspection device with a structure positioned between a probe and a reflector plate, according to an example embodiment.

FIG. 1 illustrates an ultrasonic inspection device 10 for inspection of a structure 100. The device 10 includes a body 20 with a first section 21 and a second section 22 that are on opposing sides of a gap 24. The gap 24 is sized to receive the structure 100. A probe 30 is attached to the first section 21 and transmits ultrasonic signals at the structure 100. A reflector plate 40 is attached to the second section 22 and is fixed relative to the probe 30 and reflects the signals that pass through the structure 100. The probe 30 receives a first portion of the signals that reflect off the structure 100 and a second portion of the signals that pass through the structure 100 and reflect off the reflector plate 40. The received signals provide for pulse echo and through transmission inspection of the structure 100.

Figure 2:
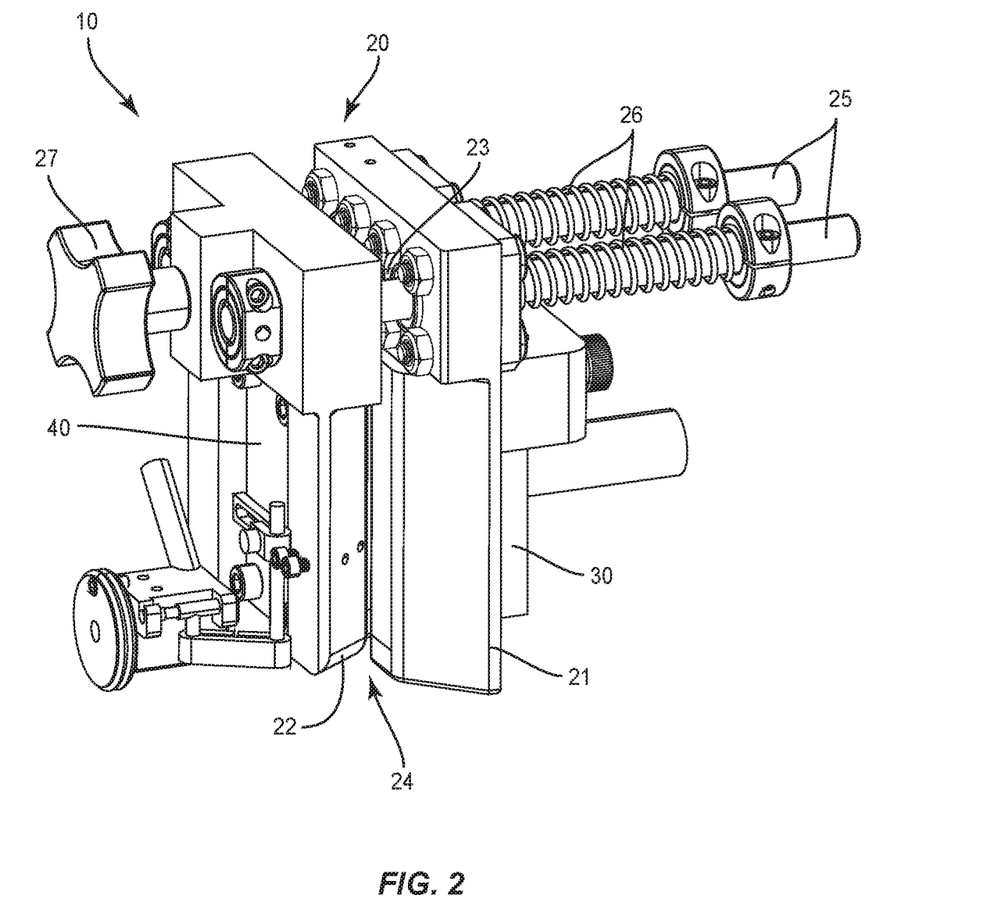
FIG. 2 is a perspective view of an inspection device, according to an example embodiment.
Figure 3:
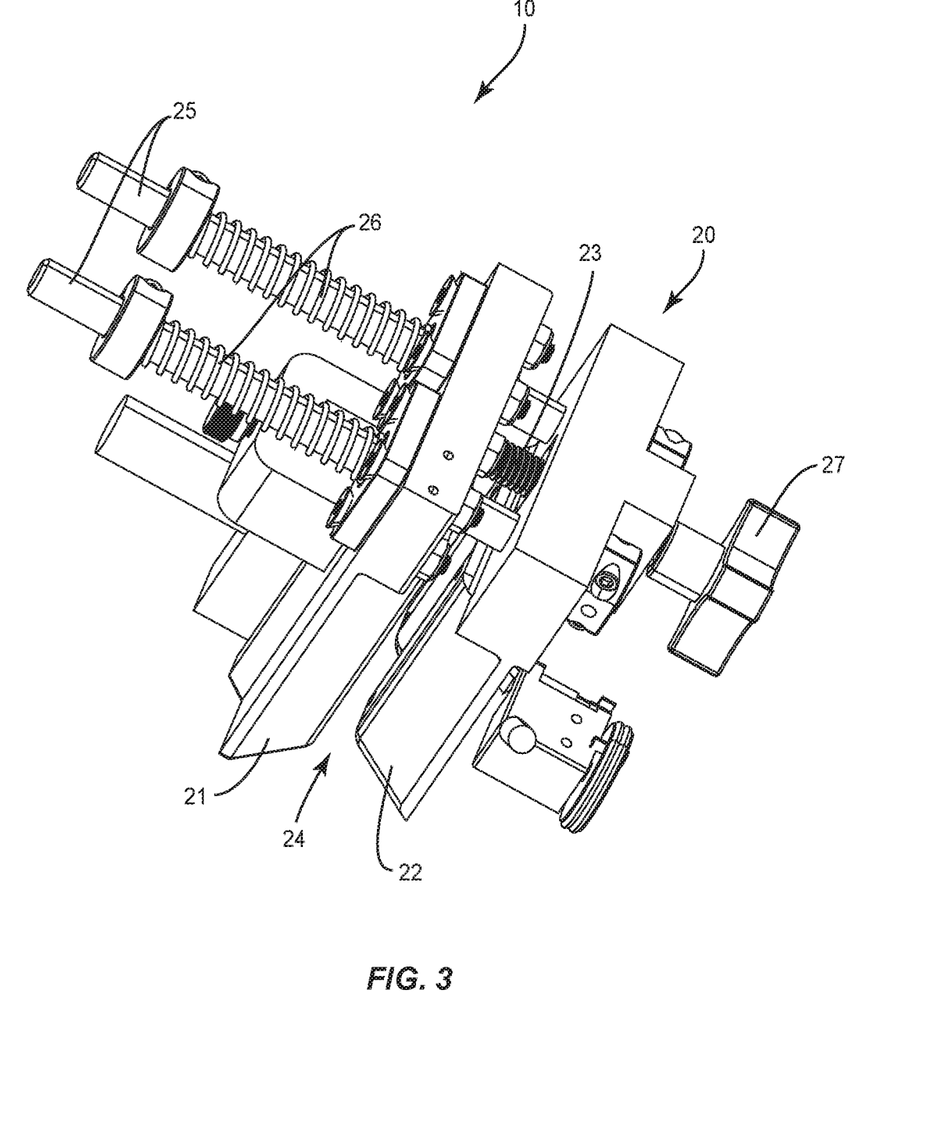
FIG. 3 is a perspective view of an inspection device, according to an example embodiment.

The body 20 provides structure to the device 10 to position and mount the probe 30 and the reflector plate 40. As illustrated in FIGS. 2 and 3, the body 20 includes the first and second sections 21, 22 that are spaced apart by the gap 24. The body 20 includes a connector 23 to adjust a distance between the first and second sections 21, 22 and thus a width of the gap 24. In an example, the connector 23 includes a jackscrew that is threaded to one or both of the first section 21 and the second section 22 is rotated in first and second directions to adjust the distance between the first and second sections 21, 22. A handle 27 is mounted to an end of the connector 23 and provides a surface for a user to contact and apply a rotational force.

In another example, the connector 23 includes an elongated member with teeth that extend along a portion of the length. One or both of the first and second sections 21, 22 are configured to engage with the teeth to control a width of the gap 24. A release on the body 20 provides for releasing the member to move the first and second sections 21, 22 apart.

Figure 4:
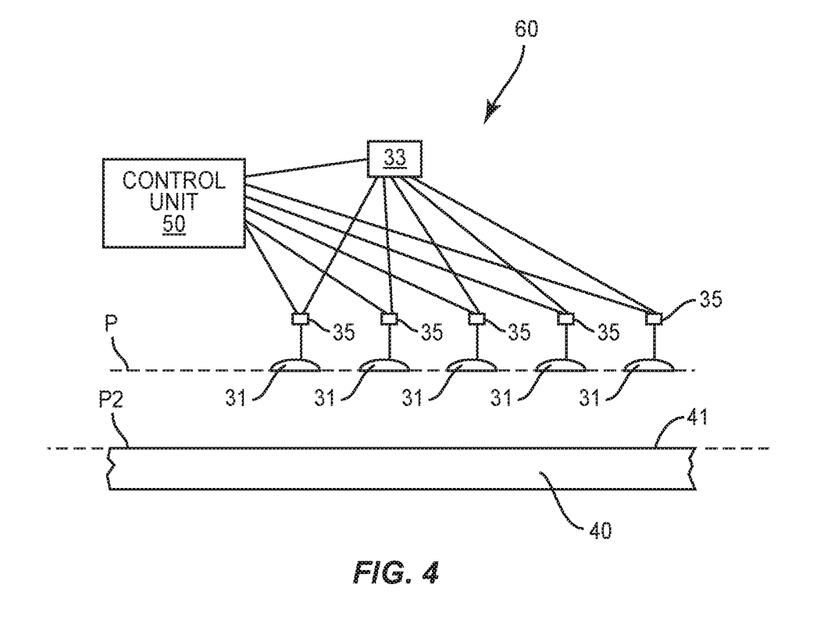
FIG. 4 is a schematic diagram of a control unit operatively connected to a transducer with transducer elements that emit ultrasonic signals towards a reflector plate, according to an example embodiment.

The body 20 can also include one or more rods 25 that extend between and connect the first and second sections 21, 22. The one or more rods 25 can extend through and/or into the first and second sections 21, 22. The rods 25 can keep the first and second sections 21, 22 oriented relative to one another. In one example as illustrated in FIGS. 3 and 4, a pair of rods 25 are positioned on opposing sides of the connector 23.

One or more biasing members 26 apply a force to bias the first and second sections 21, 22 together. In one example, the biasing members 26 are springs that extend around the rods 25. The force applied by the biasing members 26 maintains the first section 21 positioned along the rods 25. In one example, an end of the connector 23 abuts against the first section 21 with the first section 21 being movable along the rods 25. The biasing members 26 maintain the first section 21 in contact with the connector 23. The biasing members 26 can also apply a force to compress the structure 100 and provide for the probe 30 and the reflector plate 40 to ride along the surface of the structure 100. This positioning can facilitate the inspection of the structure 100. In one example, the first section 21 is moved along the rods 25 against the force of the biasing members 26 and away from the second section 22. Once the structure 100 is received in the gap 24, the first section 21 is released to move along the rods 25 towards the second section 22.

In one example, the body 20 is sized to be a hand-held unit that is manipulated by a user. In one example, the body 20 is smaller than the structure 100 that is being inspected. The body 20 is sized to receive a portion of the structure 100 within the gap 24. The device 10 is then moved along the structure 100 with the portion that moves between the probe 30 and reflector plate 40 being ultrasonically inspected.

The probe 30 is attached to the first section 21. The probe 30 can include a housing that extends around and protects electrical components. The probe 30 can include a transducer 60, which is illustrated in FIG. 4. The transducer 60 includes a beamforming oscillator 33 that produces an electronic signal. The signal is applied to an array of transducer elements 31 that are each pulsed independently. In one example, the transducer elements 31 are aligned along a plane P.

In one example, the transducer 60 is a phased array transducer. The array of transducer elements 31 transmits the signals at varying timing. In one example, the pulses from each transducer element 31 are delayed along the line of transducer elements 31. The oscillator 33 controls the timing of the emissions of the electric signals from each of the transducer elements 31 to create the pulses. In another example, timing units 35 can receive the signal from the oscillator 33 and control the timing through the transducer elements 31.

In another example, the transducer 60 is a non-phased arrayed probe 30. The transducer elements 31 in this probe 30 emit pulses at various timings that are not time arrayed with the other transducer elements 31.

In the various transducers 60, the number of transducer elements 31 can vary from a single transducer element 31 to two or more transducer elements 31. In one example as illustrated in FIG. 4, the transducer elements 31 are aligned along a plane P. In another example, the transducer elements 31 are not aligned along a plane.

Figure 5:
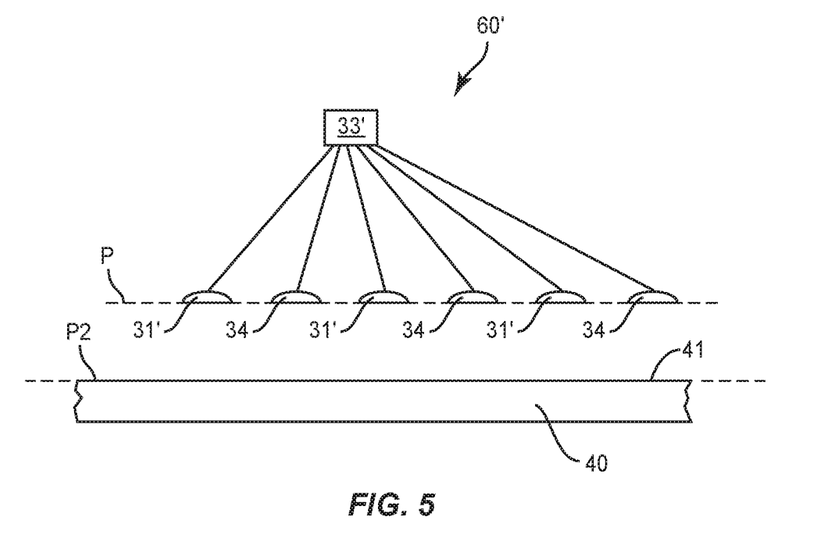
FIG. 5 is a schematic diagram of a transducer with transducer elements that emit ultrasonic signals towards a reflector plate, according to an example embodiment.

In one example as illustrated in FIG. 4, the transducer elements 31 function as transceivers to both transmit and receive the signals. In another example as illustrated in FIG. 5, the transducer 60' includes transducer elements 31' that transmit the signals and separate receiver elements 34 that receive the return signals.

In one example, the probe 30 includes one or more transducers 60. In one example, the probe 30 includes one or more first transducers 60 configured for a first type of inspection (e.g., pulse echo inspection) and one or more second transducers 60 configured for a different second type of inspection (e.g., pulse echo inspection). In another example, the probe 30 includes two or more of the same type of transducers 60. In examples with different transducers 60, the transducers 60 can emit signals at the same or different frequencies.

A control unit 50 controls the operation of the probe 30. In one example, the control unit 50 is incorporated into the probe 30. In another example the control unit 50 is separate from the probe 30 and is mounted on the body 20 of the device 10. In another example, the control unit 50 is remote from the device 10.

Figure 6:
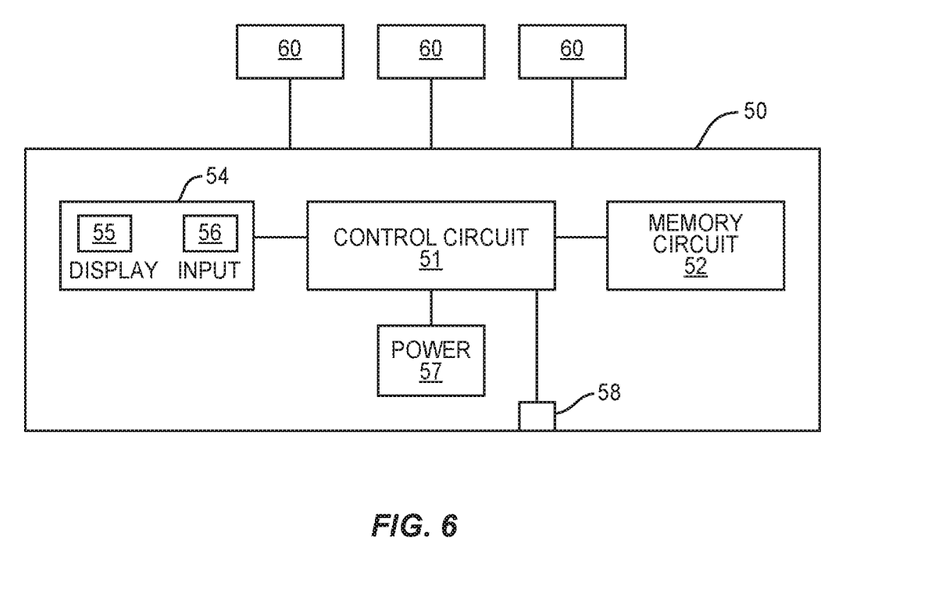
FIG. 6 is a schematic diagram of a control unit, according to an example embodiment.

As illustrated in FIG. 6, the control unit 50 includes a control circuit 51 and a memory circuit 52. The control circuit 51 controls the operation of the transducer 60 according to program instructions stored in the memory circuit 52. Within examples, the control circuit 51 includes one or more circuits, microcontrollers, microprocessors, hardware, or a combination thereof. Memory circuit 52 includes a non-transitory computer readable storage medium storing program instructions, such as a computer program product, that configures the control circuit 51 to implement one or more of the techniques discussed herein. Memory circuit 52 can include various memory devices such as, for example, read-only memory, and flash memory. In one example, memory circuit 52 is a separate component as illustrated in FIG. 6. In another example, memory circuit 52 is incorporated with the control circuit 51.

A user interface 54 provides for a user to control one or more aspects of the probe 30. This can include one or more displays 55 for displaying information to the user. The user interface 54 can also include one or more input devices 56 such as but not limited to a keypad, touchpad, roller ball, and joystick. The one or more input devices 56 provide for the user to enter commands to the control circuit 51. In different examples, the one or more displays and input devices 56 are positioned on the probe 30 and/or the body 20.

A power source 57 provides power to the control unit 50, and can also provide power to the one or more transducers 60. The power source 57 can include various configurations, including but not limited to batteries. The power source 57 can also be configured to connect with and receive power from an external source.

In one example, the control unit 50 receives data indicative of the reflected signals from the probe 30 and performs the calculations to determine or identify the one or more aspects of the structure. The control unit 50 can also be configured to output results to a remote computing device that analyzes the sensed data. In one example, the control unit 50 is configured to wirelessly transmit the signals to the remote computing device. In another example, the control unit 50 includes an output interface 58 to provide for a hardwire connection to transmit the signals.

The reflector plate 40 is positioned opposite from the probe 30 and is attached to the second section 22. The reflector plate 40 includes a reflective surface 41 that reflects the signals from the probe 30 that pass through the structure 100. The reflective surface 41 may be a separate layer that is attached to the reflector plate 40. In one example, the reflective surface 41 is a reflective paint that has been applied to the reflector plate 40. In another example, the reflector plate 40 is formed by a material that includes a reflective surface 41. For instance, in an example the reflector plate 40 is a stainless steel reflector plate with an exposed surface that forms the reflective surface 41.

The reflector plate 40 is fixed relative to the probe 30 during the inspection. In one example as illustrated in FIGS. 4 and 5, the reflective surface 41 of the reflector plate 40 is aligned in a plane P2. In one example, the reflective surface 41 is aligned in a plane P2 that is parallel or substantially parallel to the plane P of the transducer elements 31. The distance between the reflective surface 41 and a plane P in which the transducer elements 31 are aligned remains constant during the inspection.

In the examples described above, the probe 30 is attached to the first section 21 and the reflector plate 40 is attached to the second section 22. Other examples can include the inverse attachment with the probe 30 attached to the second section 22 and the reflector plate 40 attached to the first section 21.

The inspection device 10 performs both pulse-echo and through-transmission inspection by emitting the signals from the probe 30. During the inspection, the probe 30 generates one or more sound beams that are emitted from the one or more transducers 60 towards the structure 100. The one or more sounds beams have different travel paths. These one or more portions reflect back from an interface on the structure 100 and do not reach the reflector plate 40. The interfaces can include but are not limited to the front and back surfaces, intermediate surfaces, and interior aspects such as voids, delaminations, and foreign material.

One or more portions will reach the reflector plate 40. The one or more portions pass through the structure 100, are reflected off the reflector plate 40, pass through the structure 100 in a second direction, and are received by the probe 30. Imperfections or other conditions in the structure can reduce the amount of sound transmitted thus revealing their presence.

In one example, the device 10 displays the results of the ultrasonic testing on the display 55. In one example, the pulse-echo results are displayed in the form of a signal with the amplitude representing the intensity of the reflection and the distance representing the arrival time of the reflection.

Figure 7:
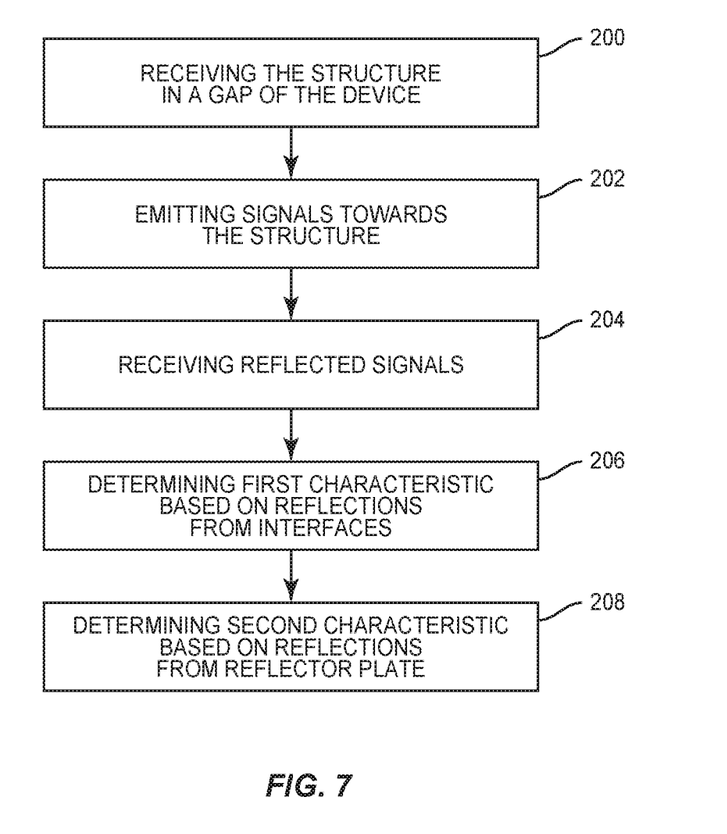
FIG. 7 is a flowchart diagram of a method of ultrasonically testing a structure, according to an example embodiment.

FIG. 7 illustrates a method of ultrasonically testing a structure 100. The method includes receiving the structure 100 in the gap 24 with the structure 100 positioned between the probe 30 that is mounted to a body 20 on a first side of the gap 24 and a reflector plate 40 that is mounted to the body 20 on a second side of the gap 24 (block 200). Once positioned, the one or more transducers 60 of the probe 30 emit ultrasonic signals towards the structure 100 (block 202).

Signal reflections are received that reflect off one or more interfaces of the structure 100 and that reflect off the reflector plate 40 after passing through the structure 100 (block 204). Pulse echo inspection determines a first characteristic of the structure 100 based on the signals that are received after reflecting off the one or more interfaces of the structure 100 (block 206). Through transmission inspection determines a second characteristic based on the signals that are received after reflecting off the reflector plate 40 (block 208).

Figure 8:
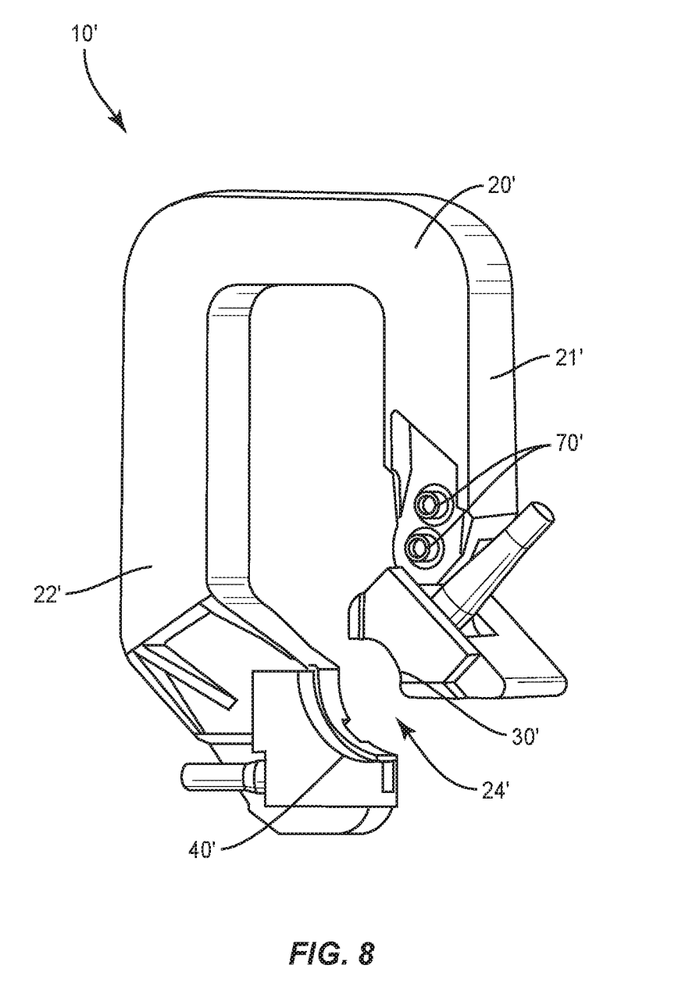
FIG. 8 is a perspective view of an inspection device, according to an example embodiment.

The inspection device 10 described above provides for an adjustable body 20. The adjustment provides for the first and second sections 21, 22 to be selectively positioned. FIG. 8 includes an inspection device 10' with a fixed body 20'. The probe 30' is mounted on a first section 21' of the body 20' and the reflector plate 40' on a second section 22'. The body 20' has a unitary construction with the first section 21' and the second section 22' being fixed relative to one another. A gap 24' is positioned between the probe 30' and reflector plate 40' for receiving the structure 100 (not illustrated in FIG. 8). Fasteners 70' can attach one or both of the probe 30' and the reflector plate 40' to the body 20'.

Figure 9:
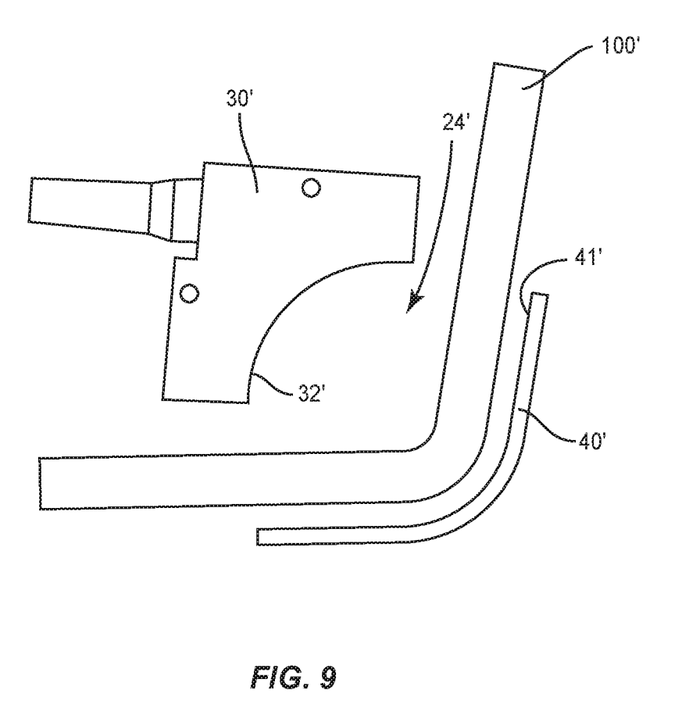
FIG. 9 is a side view of a probe and reflector plate that are positioned on opposing sides of a structure that is positioned within a gap, according to an example embodiment.

FIG. 9 illustrates a side view of the probe 30' and reflector plate 40' of FIG. 8, wherein the probe 30' and the reflector plate 40' are positioned on opposing sides of a structure 100' that is positioned within a gap 24'. In particular, FIG. 9 illustrates the probe 30' and the reflector plate 40' that are spaced apart by the gap 24'. The probe 30 includes a curved face 32' with a concave shape. In one example, the transducer elements (not illustrated in FIG. 9) are aligned along the curved face 32' and emit signals into the gap 24'. The transducer elements can include a common focal point that is located within the gap 24'. Likewise, the reflector plate 40' includes a curved shape. The reflective surface 41' has a concave shape that matches the face 32' of the probe 30'. The shapes of the curved face 32' and reflective surface 41' provide for the gap 24' to have a maximum width measured between these surfaces along a middle of the gap 24', and smaller widths at each of the ends. The inspection methods are performed in a similar manner with the structure 100' positioned in the gap 24' and the probe emitting signals and receiving reflections to perform both pulse echo and through transmission inspections.

The various shapes of the probe 30 and reflector plate 40 are used on the different bodies 20. For example, the adjustable body 20 of FIGS. 2 and 3 can include a probe 30 and reflector plate 40 that are flat and parallel or substantially parallel to one another. This adjustable body 20 can also be used with a probe 30 and reflector plate 40 that each have concave shapes. Likewise, the body 20 with the fixed size can include either of these shapes for the probes 30 and reflector plates 40.

The inspection device 10 provides for performing two separate types of inspections simultaneously on a structure 100. This saves time during the inspection process as it does not require two sequential and separate testing processes. The inspection device 10 is also sized to be a hand-held unit. In one example, the device 10 is handled and manipulated by a user. In another example, such as for inspecting larger structures, the device 10 is held by the user and moved along the length of the structure 100 to inspect the entirety of the structure 100.

The inspection device 10 and methods are used for testing a wide variety of different structures 100. One context includes testing vehicle structures that are relatively larger in size. One example of a vehicle is a commercial aircraft used for transporting passengers and/or cargo. One example of a vehicle structure is a wing or wing component of an aircraft. Other vehicles include but are not limited to unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An ultrasonic inspection device for simultaneous pulse echo inspection and through transmission inspection of a structure, the device comprising:
   a body having a first side and a second side that are spaced apart by a gap, wherein the body is configured to receive the structure in the gap between the first side and the second side;
   a probe positioned on the first side to transmit ultrasonic signals at the structure; and
   a reflector plate positioned on the second side and fixed relative to the probe;
   wherein the probe is configured to receive a first portion of the ultrasonic signals that are reflected off interfaces of the structure and a second portion of the ultrasonic signals that pass through the structure and are reflected off the reflector plate with the probe configured to receive the ultrasonic signals while the device is spaced away from the structure.

2. The device of claim 1, wherein the probe comprises one or more phased array transducers that comprise a plurality of transducer elements.

3. The device of claim 2, wherein the plurality of transducer elements of the one or more phased array transducers are aligned in a first plane and the reflector plate comprises a reflective surface that is aligned in a second plane, the first and second planes being substantially parallel.

4. The device of claim 1, further comprising a control unit with a control circuit and a memory circuit, the control unit configured to receive data indicative of the signals reflected off the interfaces and the signals reflected off the reflector plate, the control unit further configured to output a signal indicative of a porosity of the structure and to identify one or more of a void, delamination, and foreign material in the structure.

5. The device of claim 1, further comprising a jack screw that extends between the first side and the second side of the body, the jack screw being rotatable to adjust a distance between the probe that is on the first side and the reflector plate that is on the second side.

6. The device of claim 1, wherein the body comprises a unitary construction with the first side and the second side being fixed relative to one another.

7. The device of claim 1, wherein the reflector plate comprises a curved shape.

8. The device of claim 7, wherein each of the probe and the reflector plate comprise a concave shape with a center of the gap being wider than opposing ends of the gap.

9. The device of claim 1, wherein the probe comprises a plurality of transducer elements that transmit the ultrasonic signals at the structure and that receive at least one of the first portion and the second portion of the ultrasonic signals.

10. The device of claim 1, wherein the probe comprises a plurality of transducer elements that are aligned along a curved face and the reflector plate comprises a curved reflective surface, the curved face and curved reflective surface having opposing shapes with a center of the gap being wider than ends of the gap.

11. An ultrasonic inspection device for simultaneous pulse echo inspection and through transmission inspection of a structure, the device comprising:
   a body;
   a reflector plate attached to the body;
   a probe attached to the body and positioned away from the reflector plate by a gap that is sized to receive the structure, the probe transmits ultrasonic signals at the structure positioned in the gap and receives reflections of the signals that are reflected from the structure and from the reflector plate; and
   a control unit comprising a control circuit that determines a first characteristic of the structure based on the reflections of the signals that are reflected from the structure and determines a second characteristic of the structure based on the reflections of the signals that are reflected from the reflector plate;
   the body, the reflector plate, and the probe are sized and positioned to prevent contact with the structure during the inspection.

12. The device of claim 11, wherein the probe comprises a plurality of transducer elements that are aligned in a first plane and that transmit the ultrasonic signals and receive the reflections, and the reflector plate comprises a reflective surface that is aligned in a second plane, the first plane being substantially parallel to the second plane.

13. The device of claim 11, wherein the probe comprises a plurality of transducer elements that are aligned along a curved face and the reflector plate comprises a curved reflective surface, the curved face and curved reflective surface having opposing shapes with a center of the gap being wider than ends of the gap.

14. The device of claim 11, wherein the body comprises a first section and a second section that are adjustable relative to each other to adjust a distance between the reflector plate and the probe.

15. The device of claim 11, wherein the first characteristic comprises one or more of a void, delamination, and foreign material in the structure and the second characteristic comprises a porosity of the structure.

16. A method of ultrasonically testing a structure, the method comprising:
   receiving the structure in a gap formed in a body of an ultrasonic inspection device with the structure being positioned between a probe that is mounted to the body on a first side of the gap and a reflector plate that is mounted to the body on a second side of the gap;
   emitting ultrasonic signals from the probe towards the structure;
   while the structure is positioned in the gap and spaced away from the inspection device, receiving reflections of signals that reflect off one or more interfaces of the structure and reflections of signals that reflect off the reflector plate after passing through the structure;
   determining a first characteristic of the structure based on the reflections that are received after reflecting off the one or more interfaces of the structure; and
   determining a second characteristic of the structure based on the reflections that are received after reflecting off the reflector plate.

17. The method of claim 16, further comprising adjusting a width of the gap prior to receiving the structure in the gap.

18. The method of claim 16, further comprising maintaining the probe aligned substantially parallel to the reflector plate while moving the body along the structure as the structure passes through the gap and between the probe and the reflector plate.

19. The method of claim 16, further comprising emitting the ultrasonic signals from the probe in a time phased manner.

20. The method of claim 16, further comprising:
   preventing the reflector plate from moving relative to the probe while the probe is emitting the ultrasonic signals; and
   receiving the reflections of signals that reflect off one or more interfaces of the structure and reflections of signals that reflect off the reflector plate after passing through the structure.

* * * * *